June 16, 1931.　　　H. A. KING　　　1,810,020

VALVE STEM

Filed March 28, 1930

INVENTOR
Harold A. King.
BY
Harness Dickey Pierce & Hann,
ATTORNEYS.

Patented June 16, 1931

1,810,020

UNITED STATES PATENT OFFICE

HAROLD A. KING, OF BIRMINGHAM, MICHIGAN

VALVE STEM

Application filed March 28, 1930. Serial No. 439,838.

This invention relates to an improvement in the valve stems of pneumatic tires.

The main objects of this invention are to provide a construction of valve stem which has improved means for closing the stem opening of the wheel felloe; to provide improved means for eliminating the use of the customary dust cap and clamping nut of valve stems; and to provide a combined unit of this character which effectually seals the opening in the felloe against the passages of dirt and water therethrough.

An illustrative embodiment of this invention is shown in the accompanying drawings, in which Fig. 1 is a view in side elevation of a pneumatic tired vehicle wheel provided with my invention, a portion thereof being broken away and shown in section to more clearly illustrate the position of the tire stem.

Figure 1:
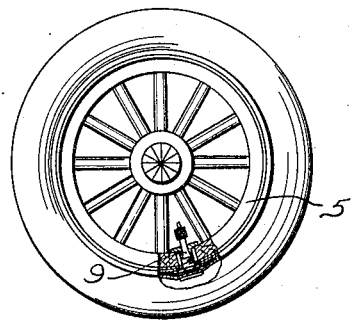

Heretofore valve stems have been constructed for use in conjunction with a clamping nut and dust cap mounted thereon, for the purpose of preventing dirt and water passing down around the valve stem through the stem opening in the felloe. More recent constructions have employed a rubber gasket mounted within the stem opening through the felloe and yieldingly retained therein.

In the older style of construction above mentioned, considerable time and effort is required when it is desired to remove the tire from the vehicle wheel. This is particularly true where the long series of threads on the valve stem, which is usually of soft material such as brass, become mutilated, thereby greatly interfering with the removal of the clamping nut. In the other type of construction above mentioned, the foregoing difficulty has been eliminated, but the mounting of the rubber gasket frictionally retained within the stem opening of the felloe has been unsatisfactory, due to the fact that when the pneumatic tire is being assembled on a wheel the valve stem is passed down through the stem opening in the felloe necessarily at a considerable angle to the axis of the opening, and the end of the stem very often engages the rubber gasket and flips it out of place.

In my improved construction disclosed herein all of the foregoing difficulties have been overcome by the provision of a unitary assembly in which the sealing gasket is bonded to the valve stem by vulcanization, and remains a unitary part of the stem assembly.

In the construction shown in the drawings, a vehicle wheel having a felloe 5 with a radially extending valve stem opening 6 therethrough is shown with a pneumatic tire mounted thereon. As is usual in such constructions, the pneumatic tire is provided with an inner tube 8 upon which is mounted a valve stem 7 which provides communication to the interior of the tube.

A portion of the valve stem 7 is of reduced diameter, as shown at 11, and a yielding gasket in the form of a radially extending rubber disc 10, having an axially extending hub 9, is bonded thereto by vulcanization, so as not to be removable therefrom without destruction. The hub 9 and that portion of the stem 7 which is not of reduced size are of substantially the same outside diameter, and the disc 10 is of greater diameter than the opening 6 through the felloe.

Figure 2:
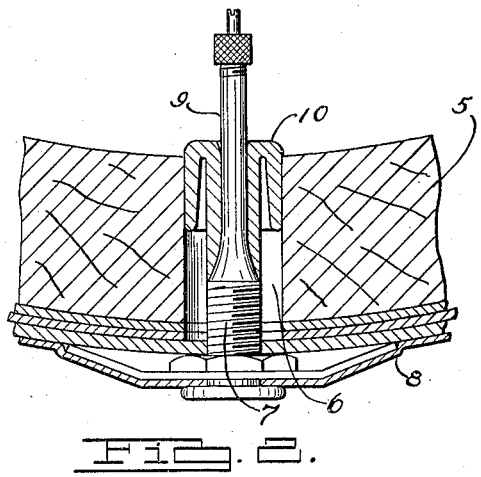
Fig. 2 is an enlarged fragmentary sectional view showing one position of the improved stem and gasket relative to a wheel felloe.
Figure 4:
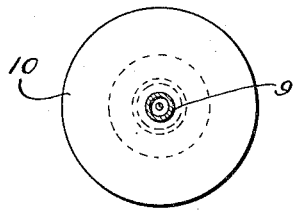
Fig. 4 is a sectional view taken on the line 4—4 of Fig. 2, looking in the direction indicated by the arrows.
Figure 3:
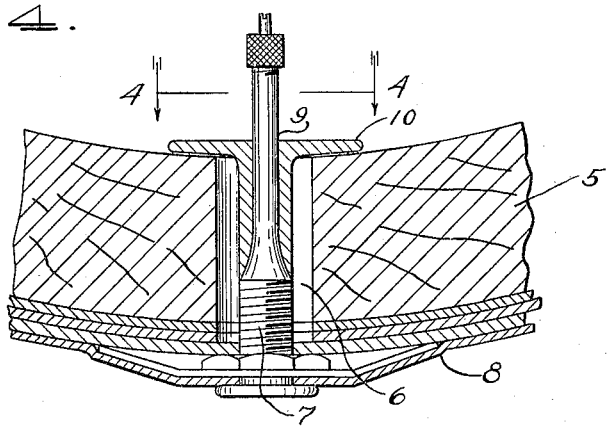
Fig. 3 is a similar view showing the gasket in another position.

In the operation and use of this device, the rubber gasket is vulcanized to the stem at the time of manufacture, so as to form part of the unitary valve stem assembly. When the pneumatic tire equipped with such a stem is placed on a vehicle wheel, the disc 10 being of yieldable rubber, may be readily forced through the opening 6. In some instances the marginal edge of the disc will remain within the opening 6, as shown in Fig. 3 of the drawings. In other instances the disc will pass entirely through the opening 6 and assume the position shown in Fig. 2 of the drawings. In either instance, the disc 10 serves as an effectual seal for preventing dirt and water from passing down through the opening 6 around the valve stem.

Although but one specific embodiment of this invention has been herein shown and described, it will be understood that numerous details of the construction shown may be altered or omitted without departing from the spirit of this invention, as defined by the following claims.

I claim:

1. The combination of a pneumatic tire stem having a reduced portion and a radially extending rubber disc having an axially extending hub secured to such reduced portion for closing the stem opening in a wheel felloe.

2. The combination of a pneumatic tire stem having a reduced portion and a radially extending rubber disc having an axially extending hub vulcanized to such reduced portion for closing the valve stem in a wheel felloe.

HAROLD A. KING.